(12) United States Patent
Reinert

(10) Patent No.: US 8,790,844 B2
(45) Date of Patent: Jul. 29, 2014

(54) FUEL CELL STACK

(75) Inventor: Andreas Reinert, Witten (DE)

(73) Assignee: Staxera GmbH, Dresden (DE)

( * ) Notice: Subject to any disclaimer, the term of this patent is extended or adjusted under 35 U.S.C. 154(b) by 165 days.

(21) Appl. No.: 13/062,884

(22) PCT Filed: Sep. 29, 2009

(86) PCT No.: PCT/DE2009/001362
§ 371 (c)(1),
(2), (4) Date: May 27, 2011

(87) PCT Pub. No.: WO2010/045912
PCT Pub. Date: Apr. 29, 2010

(65) Prior Publication Data
US 2011/0229788 A1 Sep. 22, 2011

(30) Foreign Application Priority Data
Oct. 23, 2008 (DE) .......................... 10 2008 052 945

(51) Int. Cl.
H01M 8/04 (2006.01)
H01M 8/24 (2006.01)
H01M 2/14 (2006.01)

(52) U.S. Cl.
USPC ........... 429/514; 429/457; 429/468; 429/469; 429/507; 429/509

(58) Field of Classification Search
USPC .................. 429/457, 514, 468, 469, 507, 509
See application file for complete search history.

(56) References Cited

U.S. PATENT DOCUMENTS

| 6,376,110 | B1 * | 4/2002 | Koschany | 429/413 |
|---|---|---|---|---|
| 2005/0058864 | A1 * | 3/2005 | Goebel | 429/26 |
| 2005/0181264 | A1 * | 8/2005 | Gu et al. | 429/38 |
| 2007/0048585 | A1 | 3/2007 | Kino | |
| 2007/0238000 | A1 * | 10/2007 | Koyama et al. | 429/33 |
| 2008/0145740 | A1 | 6/2008 | Blein | |

FOREIGN PATENT DOCUMENTS

| DE | 10058930 A1 | 6/2002 |
|---|---|---|
| DE | 10117572 A1 | 10/2002 |
| DE | 102005022894 A1 | 11/2006 |
| EP | 1098380 A1 | 5/2001 |
| EP | 1626454 A2 | 2/2006 |
| EP | 1686641 A1 | 8/2006 |

OTHER PUBLICATIONS

International Search Report dated Feb. 23, 2010.

* cited by examiner

Primary Examiner — Muhammad Siddiquee
(74) Attorney, Agent, or Firm — Fitch, Even, Tabin & Flannery LLP

(57) ABSTRACT

A fuel cell stack with a plurality of membrane electrode assemblies (MEAs) and a plurality of bipolar plates, wherein at least one surface of a first bipolar plate runs in undulating fashion, meandering fashion or zig-zag-shaped fashion and extreme points of the surface of the bipolar plate make contact with a first surface of a MEA at contact points. At least some of the contact points are associated with mating contact points on a second surface of the MEA, which surface is opposite the first surface of the MEA, with a surface of a second bipolar plate making contact with said mating contact points, and that the contact points and the associated mating contact points are positioned one above the other in the stacking direction. A method for producing a fuel cell stack is provided. A bipolar plate for a fuel cell stack is also provided.

8 Claims, 5 Drawing Sheets

Figure 1  State of the art
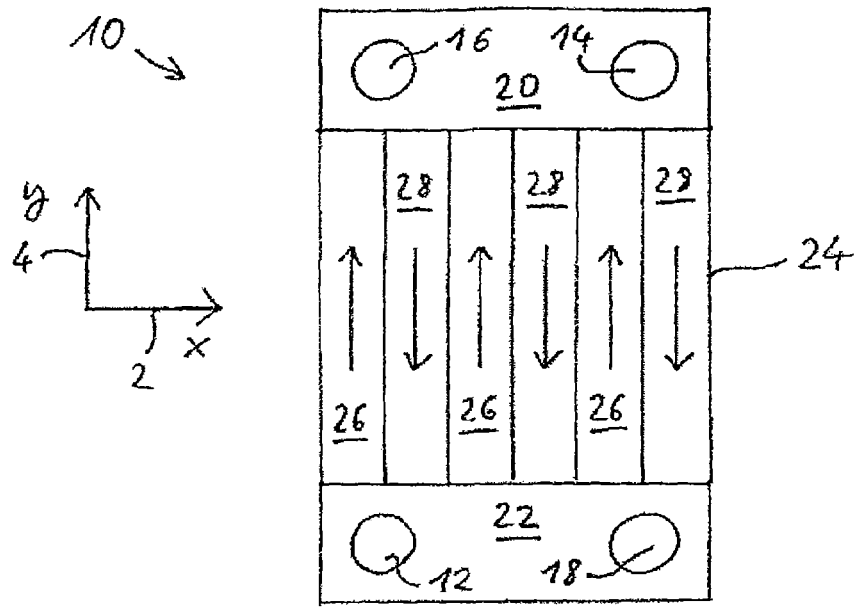
Figure 2  State of the art
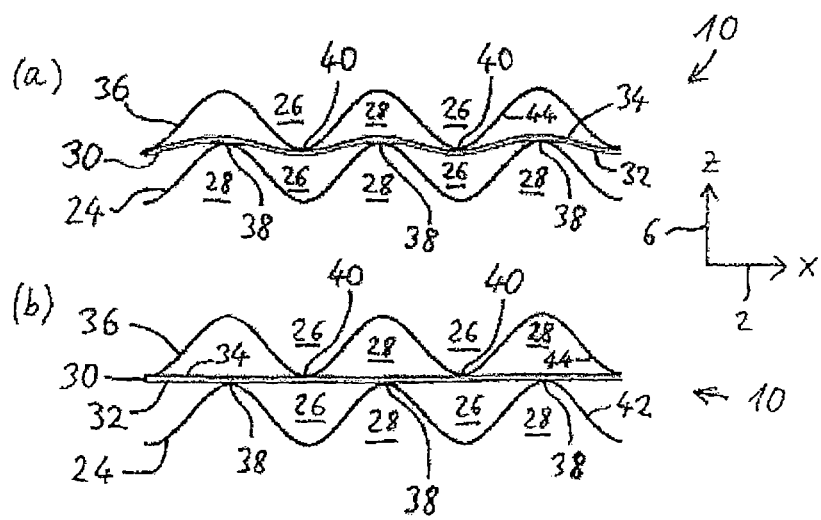

FUEL CELL STACK

CROSS-REFERENCE TO RELATED APPLICATIONS

This application is a U.S. national phase application filed under 35 U.S.C. §371 of International Application No. PCT/DE2009/001362, filed Sep. 29, 2009, designating the United States, which claims priority from German Patent Application No. DE 10 2008 052 945.1, filed Oct. 23, 2008, which are hereby incorporated herein by reference in their entirety for all purposes.

FIELD OF THE INVENTION

The invention relates to a fuel cell stack comprising a plurality of membrane electrode assemblies (MEAs) and a plurality of bipolar plates, wherein at least one surface of a first bipolar plate extends in an undulating, meandering or zig-zag-shaped fashion and extreme points of the surface of the bipolar plate contact a first surface of a MEA at contact points.

The invention further relates to a method for producing of a fuel cell stack according to the invention.

The invention further relates to a bipolar plate having an undulating, meandering or zig-zag-shaped upper surface, a bottom surface, a left wall and a right wall.

BACKGROUND OF THE INVENTION

Fuel cells, similar to batteries, serve to directly convert chemical energy into electric power. The core piece of a fuel cell is the membrane electrode unit (MEA, membrane electrode assembly) consisting of an anode layer, a cathode layer as well as an electrolyte membrane separating the anode layer from the cathode layer. For generating power a fuel gas, for example hydrogen, is supplied to the anode layer, while an oxidation gas, for example air, is supplied to the cathode layer. This leads to an oxidation of fuel gas at the anode, wherein the electrons released by the fuel gas migrate from the anode to cathode where they reduce the oxidation gas via an electrically conductive connection. The negative oxidation gas ions generated during the process combine with the positively charged fuel gas ions. If, for example, hydrogen $H_2$ is used as the fuel gas and oxygen $O_2$ as the oxidation gas oxygen ions $O^{2-}$ in and on the anode layer will combine with hydrogen ions $H^+$ to form water molecules $H_2O$ in case of a solid oxide fuel cell (SOFC). The energy released in the process can be used by connecting a consumer load between the anode and the cathode.

Since a single fuel cell only provides a low electric voltage (typically from 0.1 V to 1 V) usually a plurality of fuel cells is electrically connected in series in the form of a fuel cell stack so that the voltages of the individual fuel cells of the stack add up. In this case the cathode layer of one fuel cell is connected to the anode layer of the adjacent fuel cell via a bipolar plate, respectively.

Here the bipolar plate separates a flow area of the fuel gas from a flow area of the oxidation gas. Particularly bipolar plates having a meandering, undulating (corrugated steel-like) or zig-zag-shaped surface are proven. Bipolar plates of this type establish a contact to the adjacent fuel cell via extreme points (peak points) of their surface. The valleys positioned between the extreme points form ducts for guiding fuel gas or oxidation gas.

SUMMARY OF THE INVENTION

It is the object of the invention to improve the mechanic stability of a fuel cell stack of the type referred to in the introduction.

Said object is solved by the features of the dependent claims. Advantageous further developments emerge from the features of the dependent claims.

The fuel cell stack according to the invention is based on the state of the art in that mating contact points on a second surface of the MEA facing the first surface of the MEA are associated to at least part of the contact points, said mating contact points being contacted by a surface of a second bipolar plate, wherein the contact points and the associated mating contact points are positioned on top of each other in the stacking direction. If a force is applied to the MEA via one of the contact points a counterforce can be applied to the MEA via the corresponding mating contact point whereby strain within the MEA or deformations of the MEA are avoided which would occur in the absence of such a counterforce. The distribution of forces within the fuel cell stack can thus be optimised. A higher stiffness of the fuel cell stack in the stacking direction may also occur.

According to a preferred embodiment mating contact points are associated to all contact points. That means that there are no contact points between extreme points of the surface of the bipolar plate and of the first surface of the MEA to which no mating contact points are associated. In this way undesirable strain and deformations within the fuel cell stack are avoided in a particularly effective manner.

It is possible that the mating contact points are contacted by the surface of the second bipolar plate via metal foam, for example via nickel foam. By coating an electrode, particularly an anode, with metal foam a longer service life of the electrode may be achieved. Above that counter forces can be applied to the mating contact points via the metal foam. The prerequisite is that the foam is sufficiently rigid.

It may be particularly advantageous that the metal foam contacts the second surface of the MEA only in the mating contact points. In this it is avoided that the metal foam applies forces on areas of the second surface of the MEA to which no forces are directly transmitted by the first bipolar plate.

The first bipolar plate and the second bipolar plate may have the same shape. In particular the first and the second bipolar plate may be identical in design. The production, maintenance and repair of the fuel cell stack may be facilitated in this way.

The first bipolar plate and the second bipolar plate may, in this case, be rotated relative to each other by 180° about an axis parallel to the stacking direction. This will result in a simple and clear design of the fuel cell stack.

Alternatively the first bipolar plate and the second bipolar plate may be rotated relative to each other by 180° about an axis perpendicular to the stacking direction.

Alternatively the first bipolar plate and the second bipolar plate can be rotated relative to each other by 90° about an axis parallel to the stacking direction. Particularly in a case in which the first bipolar plate and the second bipolar plate respectively comprise a plurality of parallel bridges or corrugations (ducts) for guiding gas a particularly high stability of the fuel cell stack can be achieved by such a crossing arrangement.

According to another embodiment the first bipolar plate and the second bipolar plate have different designs. In this way geometric constraints, for example in view of symmetries of the bipolar plates, which are to be observed if the first and the second bipolar plate are to be identical in design can be avoided. Therefore a higher freedom of design is obtained in the conception of the fuel cell stack.

The surface of the first bipolar plate can be a surface of a corrugated metal sheet. In a preferred embodiment the first bipolar plate is substantially realised by a corrugated metal sheet.

The method according to the invention serves the production of a fuel cell stack according to the invention in which the first bipolar plate and the second bipolar plate are of an identical design. It is characterised in that the second bipolar plate is rotated into a position rotated by 90° relative to the first bipolar plate, and in that the bipolar plates are stacked in the relative position obtained in this way.

In a particularly preferred embodiment of the method it may be contemplated that the method comprises a step of joining the fuel cell stack in which the fuel cell stack is subjected to surface pressing. The surface pressing is realised by an extensive deformation of the extreme points of the surface of the first bipolar plate contacting the MEA. In the process no force is applied to points of the surface of the first bipolar plate without a, with respect to the MEA, opposing mating contact point via the MEA by the surface pressing. In this way, on the one hand, a, to a large extent, extensive contact between the first bipolar plate and the MEA can be established at the contact points to ensure good current conduction properties. In addition the overall height of the fuel cell stack can be reduced. On the other hand it is avoided that the entire surface of the first bipolar plate contacts the MEA.

In the step of joining the fuel cell stack the fuel cell stack may, in particular, be subjected to the surface pressing so that the extreme points of the surface of the second bipolar plate contacting the MEA are extensively deformed. In this case also no force is transmitted to points of the surface of the second bipolar plate without a, with respect to the MEA, opposing contact point via the MEA by the surface pressing. Therefore also a, to a large extent, extensive contact between the second bipolar plate and the MEA is obtained at the mating contact points.

The surface pressing thus results in a transmission of a force to the extreme points of the bipolar plate or the bipolar plates via the MEA. In this connection it is particularly advantageous if the contact points or the mating contact points are contacted via metal foam, particularly via nickel foam. Such foam is relatively flexible with respect to the surface pressing and enables the establishment of a good electric contact.

The bipolar plate according to the invention is characterised in that the left wall and the right wall are substantially merged by a rotation of 180° about an axis parallel to the stacking direction and in that at least two lower extreme points of the bottom surface are positioned under two corresponding upper extreme points of the upper surface. This enables a particularly efficient production of a fuel cell stack. First two identical bipolar plates are produced. Then the second bipolar plate is placed in a position rotated by 180° relative to the first bipolar plate. In the process at least two lower extreme points of the bottom surface of the second bipolar plate are positioned above two corresponding upper extreme points of the upper surface of the first bipolar plate. Embodiments in which all lower extreme points of the bottom surface are respectively positioned below corresponding upper extreme points of the upper surface by a rotation of 180° about an axis parallel to the stacking direction are particularly advantageous.

Such a bipolar plate is realised in a particularly simple manner in that the entirety of upper surface and bottom surface is periodical in the direction of an axis perpendicular to the stacking direction and in that its projection onto that direction is an uneven multiple of half the period length.

BRIEF DESCRIPTION OF THE DRAWINGS

FIG. 1 shows a schematic horizontal cross section of a gas flow field of a fuel cell stack;
FIG. 2 shows a schematic vertical cross section of
  (a) a deformed fuel cell stack according to a first embodiment,
  (b) a corresponding non-deformed fuel cell stack.

DETAILED DESCRIPTION OF THE INVENTION

Figure 3:
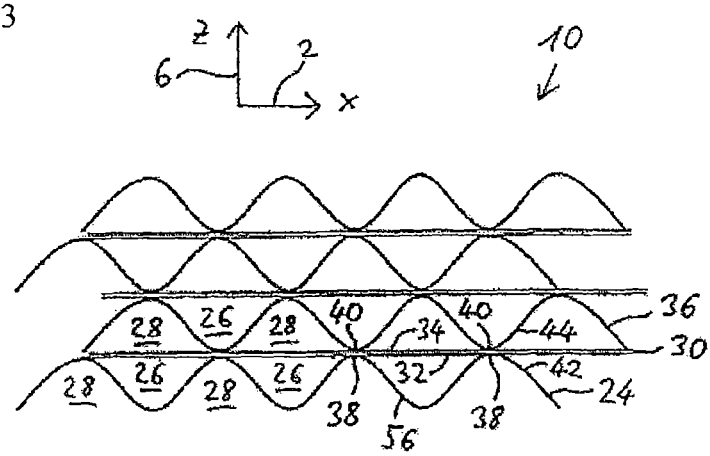
FIG. 3 shows a schematic vertical cross section of a fuel cell stack according to a second embodiment.

In the Figures identical numerals designate identical, equivalent, analogous or similar components. At least some of these components are only explained once to avoid repetitions.

FIG. 1 schematically shows a horizontal cross section of a fuel cell stack 10. The horizontal plane is identical to the x-y-plane 2, 4 (stacking plane) and perpendicular to the stacking direction (the z-direction, perpendicular to the image plane). The fuel cell stack 10 comprises a bipolar plate 24 defining a plurality of ducts 26, 28 for guiding oxidation gas or fuel gas. The ducts 26, 28 extend parallel to each other in the y-direction 4. The oxidation gas ducts 26 serve the guidance of oxidation gas, typically an oxygen-rich gas, and are disposed adjacent to a cathode not visible in the Figure of a MEA positioned below the image plane. The fuel gas ducts 28 serve the guidance of fuel gas, for example hydrogen. They are positioned adjacent to a horizontal anode not visible in the Figure of a MEA positioned above the image plane. During the operation of the fuel cell stack 10 oxygen-rich oxidation gas enters the oxidation gas ducts 26 via an oxidation gas inlet 12 and flows along the cathode (as indicated by arrows in the Figure) where a part of the gas is reduced. Oxidation gas which is not consumed as well as the reaction product (typically water) are discharged from the active area through an oxidation gas outlet 16. At the same time fuel gas (for example hydrogen) enters the fuel gas ducts 28 via a fuel gas inlet 14 and flows along the anode (as symbolised by arrows in the Figure) where it is partly ionised. Fuel gas which is not consumed is discharged from the fuel gas ducts 28 via a fuel gas outlet 18.

FIG. 2 shows a schematic vertical cross section of a portion of the fuel cell stack 10 explained with reference to FIG. 1, first in a deformed state (a) resulting from "compressing" the stack along the vertical direction 6 (the z-direction), and then in a non-deformed state (b). The fuel cell stack 10 comprises a plurality of substantially identical membrane electrode assemblies (MEAs) and a plurality of substantially identical bipolar plates stacked on top of each other in an alternating manner. A MEA 30 is positioned on a first bipolar plate 24. A second bipolar plate 36 is disposed on the MEA 30. Due to their undulating shape the first bipolar plate 24 and the second bipolar plate 36 respectively define fuel gas ducts 28 and oxidation gas ducts 26 together with the MEA. Extreme points of a surface 42 of the bipolar plate 24 contact a first surface 32 (cathode surface) of the MEA 30 at contact points 38. Extreme points of a surface 44 of the second bipolar plate 36 contact a second surface 34 (anode surface) of the MEA 30 at contact points 38. It can be seen in part (a) of the Figure that the MEA 30 is deformed in an undulating manner by the vertical forces simultaneously applied from below and from above. The forces counteracting the vertical forces and preventing a collapse of the fuel cell stack are applied by the deformation of the MEA. However, MEAs typically consist, at least partly, of a relatively brittle material. If the forces exceed critical values the material will break whereby the MEA is, at least partly, impaired in its functionality.

FIG. 3 shows a vertical cross section of a portion of a fuel cell stack 10 according to a second embodiment which is analogous to FIG. 2. The fuel cell stack 10 is designed periodically in the vertical direction 6 (z-direction) as well as in a horizontal direction 2 (x-direction). It comprises, in particular, a first bipolar plate 24, a MEA 30 and a second bipolar plate 36. The bipolar plates of the fuel cell stack, particularly the first bipolar plate 24 and the second bipolar plate 36, are of an identical design. However, embodiments in which two adjacent bipolar plates are of a different type are also possible. The MEA 30 comprises a first surface 32 (cathode surface) and a second surface 34 (anode surface). A corrugated surface 42 of the first bipolar plate 24 contacts the cathode surface 32 of the MEA 30 in contact points 38. A corrugated surface 44 of the second bipolar plate 36 contacts the anode surface 34 of the MEA in contact points 40. The corrugated profile of the second bipolar plate 36 is displaced relative to the corrugated profile of the first bipolar plate 24 by half a period, i.e. by half the corrugation length, in the x-direction. The result is that the contact points 38 and the contact points 40 are positioned on top of each other, i.e. that they project on each other in the z-direction (stacking direction). The contact points 40 between the second bipolar plate 36 and the MEA 30 thus form mating contact points with respect to the contact points 38 between the first bipolar plate 24 and the MEA 30. If the first bipolar plate 24 and the second bipolar plate are pressed against each other in the vertical direction, for example by gravity or by an intentional bracing of the fuel cell stack 10, the force acting upwards from the contact point 38 and the force acting downwards from the contact point 40 will compensate each other in the point of the MEA 30 positioned between two contact points 38, 40 disposed on top of each other. The MEA 30 will therefore not be significantly deformed. In the illustrated example the surface 42 forms an upper surface of the first bipolar plate 24. The bipolar plate 24 also comprises a bottom surface 56. The bottom surface 56 and the upper surface 42 are geometrically similar in the illustrated example, however, on principle they may also be significantly different. In particular the bottom surface does not have to be undulated, meandering or zig-zag-shaped.

Figure 4:
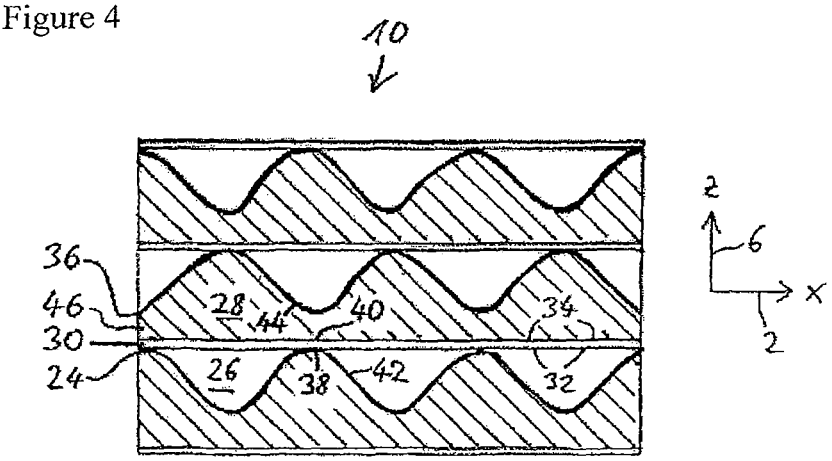
FIG. 4 shows a schematic vertical cross section of a fuel cell stack according to a third embodiment.

In the third embodiment shown in FIG. 4 nickel foam 46 is disposed in the ducts 28 between the second bipolar plate 36 and the second surface (anode surface) 34 of the MEA 30. In this way the efficiency of the MEA can be increased and/or its service life prolonged. During the operation the fuel gas flows through the ducts 28 filled with the nickel foam 46. The surface 44 of the second bipolar plate 36 will now not contact the anode surface 34 directly but indirectly via the nickel foam 46 in the mating contact points 40.

Figure 5:
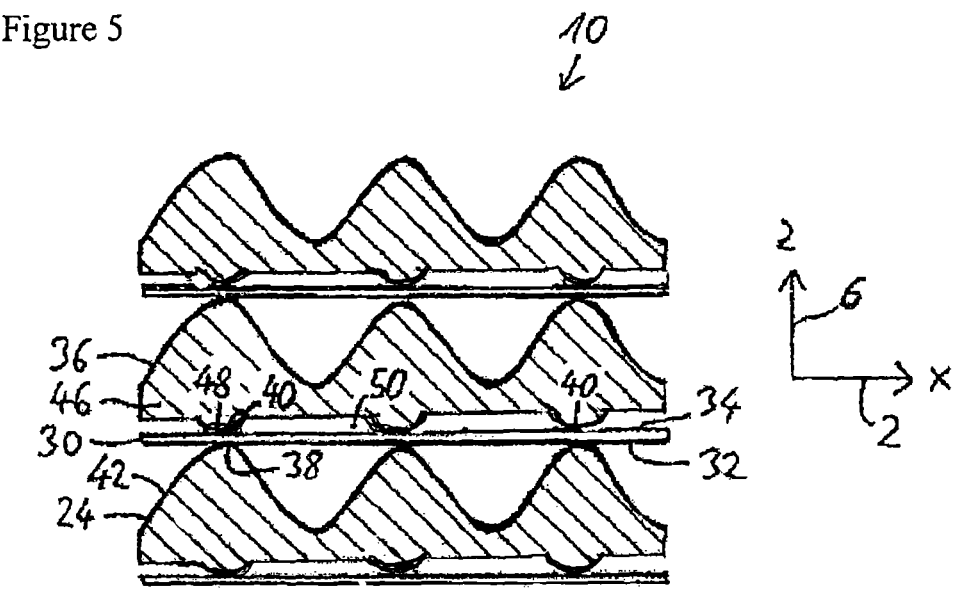
FIG. 5 shows a schematic vertical cross section of a fuel cell stack according to a fourth embodiment.

The fourth embodiment outlined in FIG. 5 differs from the second and the third embodiment particularly in that the first bipolar plate 24 and the second bipolar plate 36 are identical and at the same time not horizontally offset or rotated with respect to each other. The ducts 28 are only partly filled with nickel foam 46. The nickel foam 46 comprises bridges 48 which extend parallel to the ducts 26, 28 in the y-direction and are disposed adjacent to the anode surface 34 of the MEA 30 in mating contact points 40. The mating contact points 40 also extend in the y-direction. Two adjacent bridges 48 define a hollow space 50 together with the anode surface 34. Each bridge 48 contacts the MEA 30 in a mating contact point 40 of the surface 34.

Figure 6:
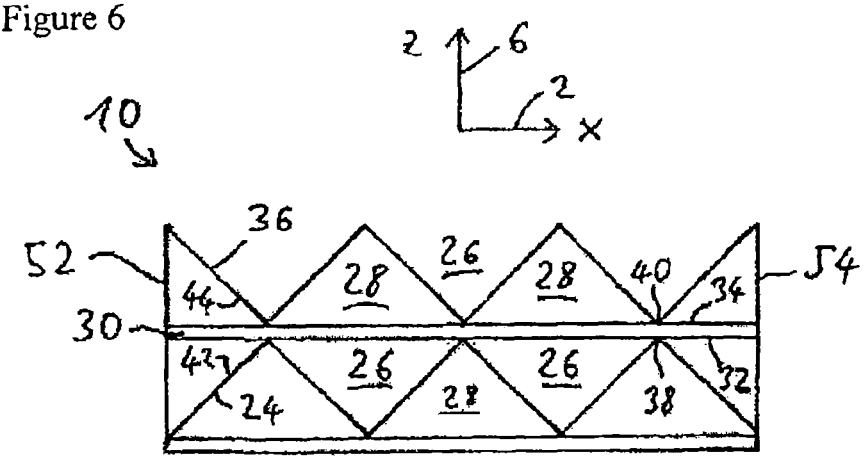
FIG. 6 shows a schematic vertical cross section of a fuel cell stack according to a fifth embodiment.

FIG. 6 illustrates an embodiment which is substantially analogous to the embodiment described with reference to FIG. 3. A z-axis 6 extends parallel to the stacking direction. A y-axis (not shown) extends perpendicular to the z-axis and to the image plane. The y-axis extends parallel to fuel gas ducts 28 and oxidation gas ducts 26. An x-axis 2 extends perpendicular to the z-axis 6 and is positioned in the image plane. The fuel cell stack 10 is laterally confined by a left wall 52 and by right wall 54 which both extend parallel to the y-z-plane. A first bipolar plate 24 and a second bipolar plate 36 are identical in design and comprise a zig-zag-shaped cross section in the z-x-plane, respectively. The zig-zag-shaped cross section defines fuel gas ducts 28 and oxidation gas ducts 26. The first bipolar plate 24 and the second bipolar plate 36 are rotated relative to each other by 180° about the y-axis. The result is that respectively one of the upper extreme points of the surface 42 of the first bipolar plate 24 extending in the y-direction and one of the lower extreme points of the surface 44 of the second bipolar plate 36 extending in the y-direction face each other to form a contact point 38 and a corresponding mating contact point 40 together with the MEA 30.

Figure 7:
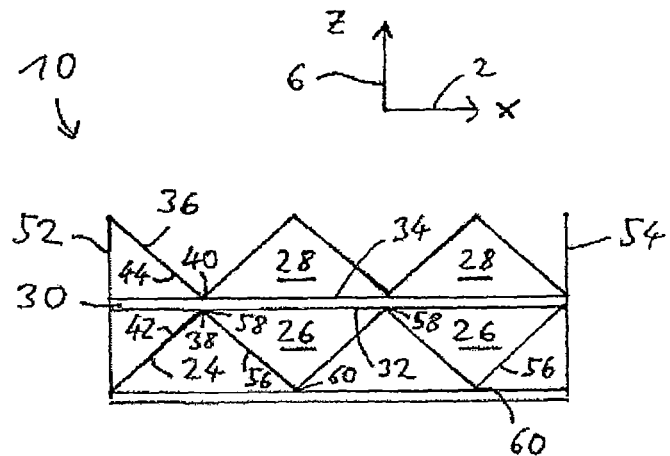
FIG. 7 shows a schematic vertical cross section of a fuel cell stack according to a sixth embodiment.

The fuel cell stack 10 schematically shown in FIG. 7 illustrates a related embodiment. The first bipolar plate 24 comprises a zig-zag-shaped upper surface 42 and a zig-zag-shaped lower surface 56. All lower extreme points 60 of the bottom surface 56 are positioned below corresponding upper extreme points 58 of the upper surface 42 by a rotation of 180° about a selected axis which is parallel to the stacking direction 6, and the left wall 52 and the right wall 54 are merged. The entirety of upper surface 42 and bottom surface 56 is periodical in the x-direction 2, its projection on the x-direction (i.e. its maximum dimension in the x-direction 2) being an uneven multiple of (here five times) half the period length. Here the period length is identical to the distance in the x-direction between adjacent extreme points 60 of the bottom surface 56, or, equivalently expressed, to the distance in the x-direction between adjacent extreme points 58 of the upper surface 42. The first bipolar plate 24 and the second bipolar plate 36 are rotated relative to each other by 180° about the z-axis 6 which is parallel to the stacking direction. The result is that respectively one of the upper extreme points of the surface 42 of the first bipolar plate 24 extending in the y-direction and one of the lower extreme points of the surface 44 of the second bipolar plate 36 extending in the y-direction face each other to form a contact point 38 and a corresponding mating contact point 40 together with the MEA 30.

Figure 8:
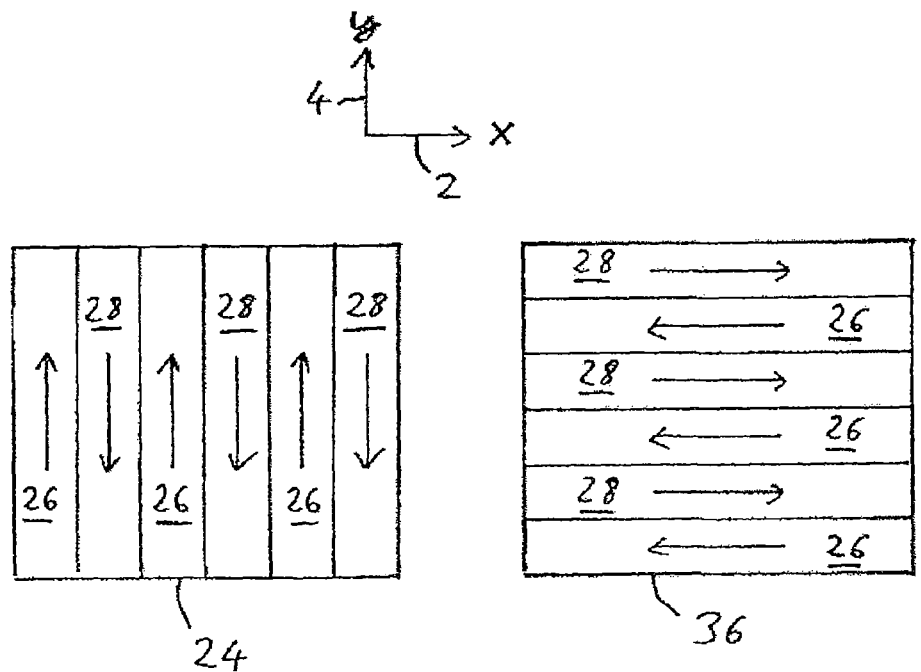
FIG. 8 shows a schematic horizontal cross section of two adjacent bipolar plates of a fuel cell stack according to a seventh embodiment.

FIG. 8 illustrates another embodiment. A fuel cell stack comprises a first bipolar plate 24 and a second bipolar plate 36 which are rotated relative to each other by 90° about the z-axis extending parallel to the stacking direction (and perpendicular to the image plane). The two bipolar plates 24, 36 are shown adjacent to each other in the Figure, however, actually they are disposed on top of each other in the stacking direction. The design of the two bipolar plates 24 and 36 is substantially similar to the design of the corresponding bipolar plates of FIG. 6 or FIG. 7, i.e. they have a zig-zag-shaped cross section, respectively. Their cross section could, however, also be undulated or meandering. The ducts 26, 28 of the first bipolar plate 24 and the ducts 26, 28 of the second bipolar plates are positioned on top of each other in the stacking direction and intersect in right angles. The extreme points of one surface of the first bipolar plate 24 extend in the y-direction 4 while the extreme points of one surface of the second bipolar plate 36 extend in the x-direction 2. Together they define a square grid which is parallel to the x-y-plane, a contact point between the first bipolar plate 24 and a first surface of a MEA (not visible) and a corresponding mating contact point between the second bipolar plate 36 and a second surface of the MEA being associated to each grid point.

Figure 9:
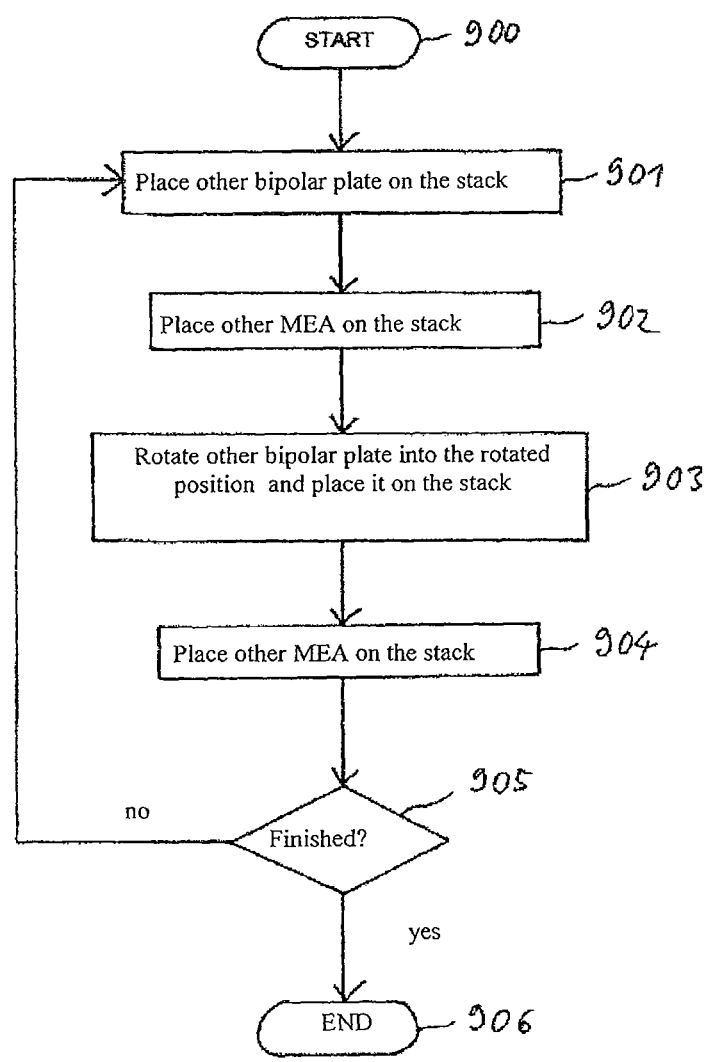
FIG. 9 shows a flow chart of a method for producing a fuel cell stack.

FIG. 9 illustrates a method for producing a fuel cell stack. The method starts in step 900. In step 901 another bipolar plate is positioned on the existing part of the fuel cell stack to be produced. On this bipolar plate another MEA is positioned (step 902). In the following step 903 another bipolar plate of a design identical to that of the bipolar plate positioned last (i.e. in step 901) is rotated into a position rotated or turned relative to the bipolar plate last positioned and then placed on the MEA. For example, the additional bipolar plate is rotated so that a fuel cell stack according to one of the embodiments schematically shown in FIGS. 3, 4, 6, 7 and 8 is produced. Then in step 904 another MEA is positioned on the stack, i.e. on the rotated bipolar plate. It is feasible that the design of the additional MEA is identical to that of the previous MEA and that it is rotated relative to the previous MEA like the bipolar plate it is positioned on. In step 905 it is then determined whether further units are to be positioned on the stack. If this is the case the process flow returns to step 901, i.e. at least two additional bipolar plates and two additional MEAs are placed on the stack. If not the method is completed (step 906).

In a subsequent process of joining the fuel cell stack a force for surface pressing is applied which compresses the bipolar plates and MEAs. It is advantageous to adjust this force so that the protruding points or extreme points of the bipolar plates, i.e. the points of the bipolar plates contacting the MEA at contact points or mating contact points, are extensively deformed. In this way a largely extensive contact is established. During surface pressing no increased action of force is to be generated yet in the areas of the bipolar plates without a mating contact. This can be achieved particularly well if nickel foam is used which is relatively flexible. The protruding points are thus pressed together to enable an extensive contact and a low overall height. In this connection it has to be kept in mind that the increased force is not applied to the areas without a mating contact to prevent, for example, nickel foam from being uniformly distributed across the MEA surface and forming a mating contact extensively instead of in selected positions.

Spatial terms like "top", "bottom", "left", and "right" only serve the description of the relative positions of components. They have no absolute meaning and are therefore exchangeable.

The invention claimed is:

1. A fuel cell stack comprising a plurality of membrane electrode assemblies (MEAs) and a plurality of bipolar plates, wherein at least one surface of a first bipolar plate extends in an undulating, meandering or zig-zag-shaped fashion, and extreme points of the surface of the first bipolar plate contact a first surface of a MEA at contact points, wherein a mating contact points on a second surface of the MEA facing the first surface of the MEA are associated to at least a part of the contact points, said mating contact points being contacted by a surface of a second bipolar plate, and in that the contact points and the associated mating contact points are arranged on top of each other in the stacking direction;
    wherein the mating contact points are contacted by the surface of the second bipolar plate via metal foam; and
    wherein the metal foam contacts the second surface of the MEA in the mating contact points only.

2. The fuel cell stack of claim 1, wherein the mating contact points are associated to all contact points.

3. The fuel cell stack of claim 1, wherein the first bipolar plate and the second bipolar plate have the same shape.

4. The fuel cell stack of claim 3, wherein the first bipolar plate and the second bipolar plate are rotated relative to each other by 180° about an axis parallel to the stacking direction.

5. The fuel cell stack of claim 3, wherein the first bipolar plate and the second bipolar plate are rotated relative to each other by 180° about an axis perpendicular to the stacking direction.

6. The fuel cell stack of claim 3, wherein the first bipolar plate and the second bipolar plate are rotated relative to each other by 90° about an axis parallel to the stacking direction.

7. The fuel cell stack of claim 1, wherein the surface of the first bipolar plate is a surface of a corrugated metal sheet.

8. A fuel cell stack comprising a plurality of membrane electrode assemblies (MEAs) and a plurality of bipolar plates, wherein at least one surface of a first bipolar plate extends in an undulating, meandering or zig-zag-shaped fashion, and extreme points of the surface of the bipolar plate contact a first surface of a MEA at contact points, wherein mating contact points on a second surface of the MEA facing the first surface of the MEA are associated to at least a part of the contact points, said mating contact points being contacted by a surface of a second bipolar plate, and in that the contact points and the associated mating contact points are arranged on top of each other in the stacking direction, wherein the mating contact points are contacted by the surface of the second bipolar plate via metal foam, wherein the metal foam comprises bridges, wherein the bridges are disposed adjacent to the second surface of the MEA in the mating contact points; wherein the bridges contact the second surface of the MEA in the mating contact points only.

* * * * *